United States Patent [19]

Jones

[11] Patent Number: 5,765,990
[45] Date of Patent: Jun. 16, 1998

[54] WIND WHEEL FOR THE GENERATION OF ELECTRICAL ENERGY

[76] Inventor: Byron O. Jones, 1730 Commercial Pkwy., No. 11, Santa Cruz, Calif. 95065

[21] Appl. No.: 839,635

[22] Filed: Apr. 15, 1997

[51] Int. Cl.$^6$ ............................................. F03D 7/00
[52] U.S. Cl. ..................... 415/2.1; 415/4.3; 415/4.5
[58] Field of Search ..................... 415/2.1, 4.1, 4.3, 415/4.5, 905, 908; 416/11, 10, 9

[56] References Cited

U.S. PATENT DOCUMENTS

| 381,313 | 4/1888 | Winchell | 416/11 |
|---|---|---|---|
| 2,563,279 | 8/1951 | Rushing | 415/2.1 |

*Primary Examiner*—John T. Kwon
*Attorney, Agent, or Firm*—Jeffrey A. Hall

[57] ABSTRACT

A wind wheel apparatus for the generation of electrical energy including a support tower, a platform mounted on the support tower and a wind wheel positioned on the platform substantially off-set from a central axis of the support tower so that the wind wheel is automatically positioned to face into a wind stream. The wind wheel has an outer housing having an outer wall and an inner wall enclosing a plurality of bearings. A geared flange having an outer rim and an inner rim is secured to the outer housing. The outer rim of the geared flange is secured on one side to the inner wall of the outer housing and is in moveable contact with the plurality of bearings. The geared flange has a plurality of gear teeth operably positioned therein. A central hub has a propeller operably secured to it for engagement with the inner rim of the geared flange. The geared flange is rotatable within the outer housing. A drive shaft for engagement with the geared flange has access to the geared flange through an access aperture in the outer housing. The drive shaft is operably linked to a generator mounted on the platform. A support brace for supporting the wind wheel on the platform is also provided.

18 Claims, 3 Drawing Sheets

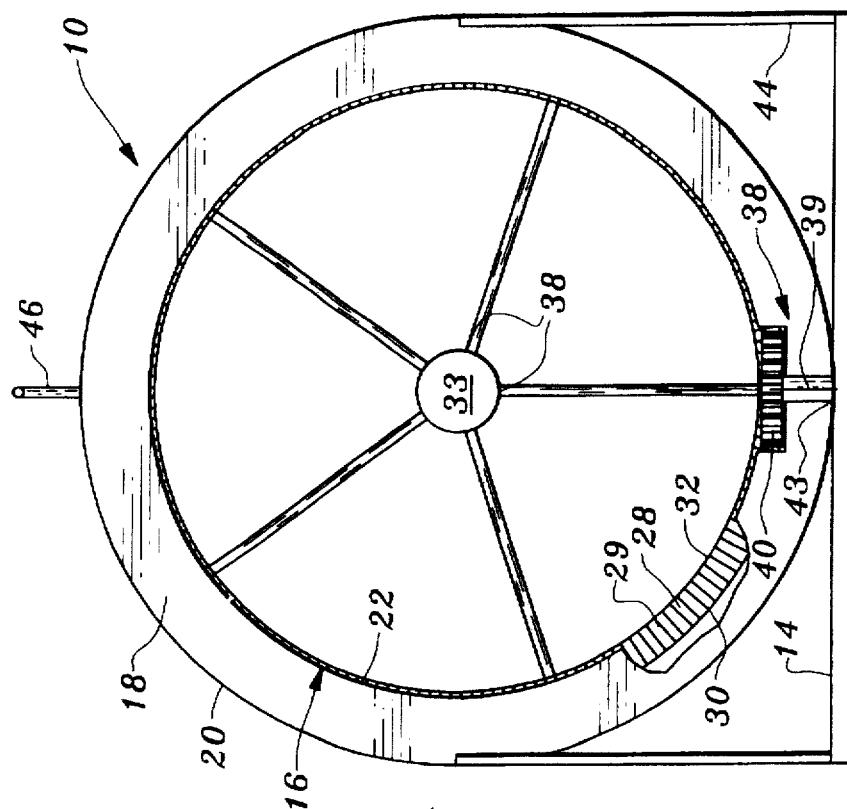

WIND WHEEL FOR THE GENERATION OF ELECTRICAL ENERGY

BACKGROUND OF THE INVENTION

1. Field of Invention

This invention relates to wind wheels and windmills for the generation of electrical energy, and particularly to an improved wind wheel apparatus having a tower with a platform with a wind wheel and generator operably mounted thereon.

2. Description of the Related Art

Various windmills have been proposed and implemented for lifting water and for generating electrical energy. A great many designs and configurations have been proposed with incremental improvements upon the original design. Such improvement have generally relied upon advances in unrelated technologies such as metallurgy, material handling, composite manufacture, and the like. Improved design and reactive qualities of the windmill propellers and blades have also been made.

Other developments have included efforts to increase the rotational speed of the shaft, with the power output through a transmission. The benefit of such increased rotational speed is the ability to use inexpensive, lighter, and more dependable high speed generators. However, such transmission is limited by higher manufacturing costs, higher maintenance costs, significant down time during routing maintenance, and loss of output power due to friction. Alternatively, if the transmission is eliminated, a much heavier and more expensive low speed generator is required.

In general, wind at ground level is very turbulent, and because of this windmills are built and positioned on towers to gain access to less turbulent air. The height of the tower is dependent upon two factors. The first is the local topography which largely controls the depth of the turbulent air. The second is the length of the blades of the propeller. As the blades must be above the turbulent air and the propeller is supported at the hub, the length of the blade must be added to the height of the tower. This results in the requirement that conventional windmills and wind wheels propellers and blades must be raised a significant distance from the ground.

To generate electricity, windmills and wind wheels must face into the wind. There are currently two conventional solutions to this problem. The first is termed a "down wind" windmill. In this type of windmill, the propellers are mounted down wind, or behind the support tower, so that the windmill automatically follows the wind as it changes direction. A significant problem with this type of windmill, however, is that the propellers pass the "dead" air behind a solid tower or the very turbulent air behind an open tower, it causes a vibration through the entire windmill and tower system, and results in a noise similar to the sound of a helicopter.

The other solution the aforementioned problem of having the windmill continually facing into the wind, is the "upwind" windmill, where the propeller is mounted upwind or in front of the support tower. In the case of small windmills, the propellers can be forced into the wind by using a large aileron mounted behind the propeller. With large windmills an electronic sensor is used to sense the wind direction and an electric powered controller is used to force the windmill into the wind. A significant drawback to the use of an aileron is visual as it must be large and located at right angles to the plane of the propeller. Other drawbacks include the cost of manufacture, installation and maintenance. With the "sensor" system, the visual impact is small, but the cost of manufacture, installation and maintenance can add a considerable amount to the total cost of the windmill-generator system. More importantly, the failure, or partial failure of either one of these "aiming" apparatuses can cause the entire windmill-generator system to be inoperable until repaired.

Early windmills were used primarily for lifting water and utilized a push type blade as propellers. They were typically constructed of many flat wood blades attached to the central hub at an angle so that the wind pushing against the blades caused the propeller to spin. Such windmills had the advantage of relative high torque at low rpm. The major drawbacks were a very high wind resistance at a higher rpm, which made them prone to break downs and mechanical failure due to centrifugal force. Some of these problems were lessened by using metal components instead of wood, but metal increased their weight, which increased friction, and lessened efficiency.

With the advent of using windmills to generate electric energy, the push propeller was replaced with the pull type propeller. This type of propeller is designed in a manner similar to an airplane wing so that the air moving past the propeller blade provides lift, or a negative air pressure, on one side of the blade which pulls the blade around. This design allows for a much higher operational rpm with less wind resistance.

However, increasing rpm has led to other difficulties. Windmills of this type now being used are composed of a set of pull blades attached to a hub, which is attached to a central shaft, which in turn is attached to an alternator. While the blades must be strong, they cannot be heavy, because at a high rpm the combination of outer tip speed and centrifugal force can cause a blade to fail disastrously. When this happens, the entire windmill is usually destroyed by the vibration which results from being out of balance.

While this basic design has been used for many years with minor improvements there are still many limitations and disadvantages inherent with such design. One of the most significant is at the hub where the propeller blades roots are attached. Many problems arise at this point because of the problems of precisely attaching very unlike materials together, such as wood or fiberglass blades to a steel or aluminum hub, and to have them function for long periods of time under high speed and high torque conditions. Also of concern in certain areas is that conventional windmills take a heavy toll on birds, particularly predatory birds. When the blades are spinning, birds apparently believe that the generator housing is the highest spot on the apparatus and when attempts to land on it are made, the bird is typically killed.

Accordingly, the present invention provides an improved wind wheel which allows a support tower to be constructed at a minimum height to reach the less turbulent wind. A wind wheel is mounted on a platform on the tower, off-set downwind from the tower, allowing the wind wheel to automatically face into the wind. The wind wheel includes an outer flange with geared teeth on one side and with the propeller attached on the inside. At the bottom of the geared flanged a drive shaft is coupled to the rim to drive an alternator suspended vertically below for the generation of electrical energy. This allows the propeller blades to be made out of very light material because the outer flange would control and contain the centrifugal forces. Since the power output is at the rim of the wind wheel instead of at the central shaft as in conventional windmills and wind wheels, lower torque results. With the present invention, because of the great difference in the circumference of the wind wheel and the circumference of the generator shaft, high rpm input to the generator is not a problem. Since the highest spot on the wind wheel is the top of the outer housing of the geared flange, a perch may be provided for predatory and other birds to land upon.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purpose of the invention as embodied and broadly described herein, a wind wheel apparatus for the generation of electrical energy is provided including a support tower, a platform mounted on the support tower and a wind wheel positioned on the platform substantially off-set from a central axis of the support tower so that the wind wheel is automatically positioned to face into a wind stream. The wind wheel has an outer housing having an outer wall and an inner wall enclosing a plurality of bearings. A geared flange having an outer rim and an inner rim is secured to the outer housing. The outer rim of the geared flange is secured on one side to the inner wall of the outer housing and is in moveable contact with the plurality of bearings. The geared flange has a plurality of gear teeth operably positioned therein. A central hub has a propeller operably secured to it for engagement with the inner rim of the geared flange. The geared flange is rotatable within the outer housing. A drive shaft for engagement with the geared flange has access to the geared flange through an access aperture in the outer housing. The drive shaft is operably linked to a generator mounted on the platform. A support brace for supporting the wind wheel on the platform is also provided.

Preferably the outer housing is composed of a durable resilient material such as steel and has an access aperture for the drive shaft for coupling with the geared flange. The drive shaft is operably linked to a generator which is preferably positioned vertically below the platform.

There is also provided, in accordance with the invention a power generating wind-driven wind wheel apparatus comprising a support tower, a platform mounted on the support tower and a wind wheel mounted on the platform positioned substantially off-set from a central axis of the support tower so that the wind wheel is automatically positioned to face into a wind stream. The wind wheel includes an outer housing having an outer wall and an inner wall enclosing a plurality of bearings. An inner rim having an outer wall and an inner wall is secured to the outer housing. The outer wall of the inner rim being secured on one side to the inner wall of the outer housing and is in moveable contact with the plurality of bearings. The inner rim having a plurality of gear teeth operably positioned therein. A central hub having propeller means operably secured thereto for engagement with the inner wall of the inner rim is positioned within the inner rim. The inner rim is rotatable within the outer housing. Drive shaft means for engagement with the inner rim are provided with the drive shaft means being operably linked to a generator communicativley coupled with the wind wheel. Support means, preferably comprising a brace are provided for supporting the wind wheel on the platform.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 is perspective view of a wind wheel for the generation of electrical energy, according to the invention.

FIG. 2 is a front view of the outer housing and geared flange, according to the invention.

DESCRIPTION OF THE PREFERRED EMBODIMENTS

Figure 3:
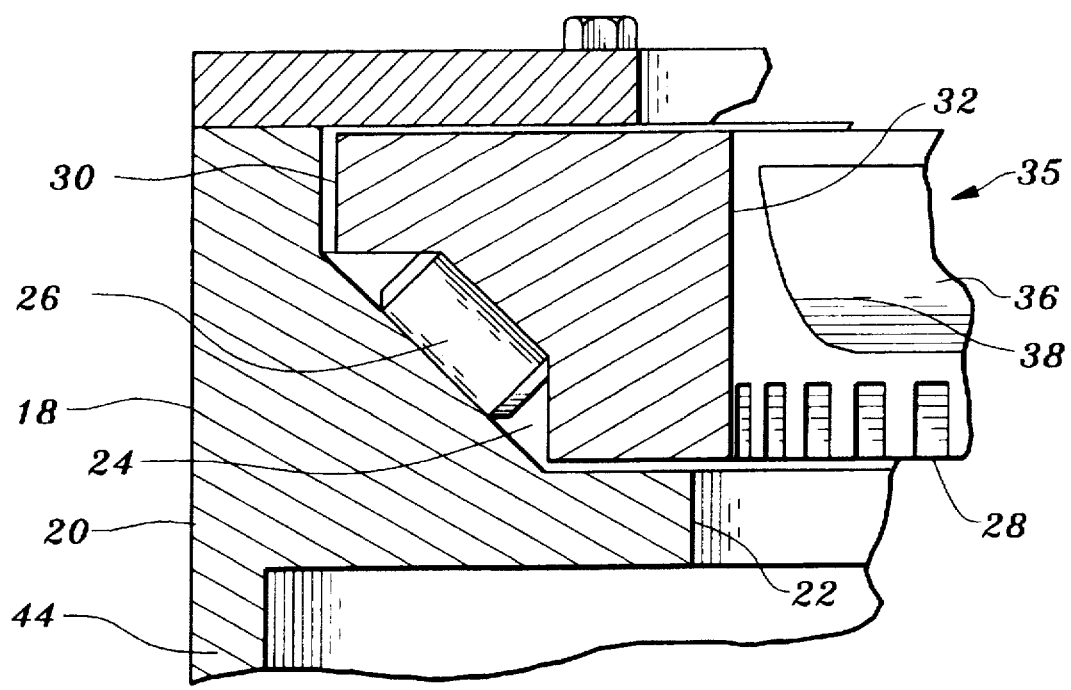
FIG. 3 is a sectional view of such wind wheel, according to the invention.

Reference will now be made in detail to the present preferred embodiments of the invention as illustrated in the accompanying drawings.

In accordance with the present invention, there is provided a wind wheel apparatus for the generation of electrical energy including a support tower, a platform mounted on the support tower and a wind wheel positioned on the platform substantially off-set from a central axis of the support tower so that the wind wheel is automatically positioned to face into a wind stream. The wind wheel has an outer housing having an outer wall and an inner wall enclosing a plurality of bearings. A geared flange having an outer rim and an inner rim is secured to the outer housing. The outer rim of the geared flange is secured on one side to the inner wall of the outer housing and is in moveable contact with the plurality of bearings. The geared flange has a plurality of gear teeth operably positioned therein. A central hub has a propeller operably secured to it for engagement with the inner rim of the geared flange. The geared flange is rotatable within the outer housing. A drive shaft for engagement with the geared flange has access to the geared flange through an access aperture in the outer housing. The drive shaft is operably linked to a generator mounted on the platform. A support brace for supporting the wind wheel on the platform is also provided.

There is also provided, in accordance with the invention, a power generating wind-driven wind wheel apparatus comprising a support tower, a platform mounted on the support tower and a wind wheel mounted on the platform and positioned substantially off-set from a central axis of the support tower so that the wind wheel is automatically positioned to face into a wind stream. The wind wheel includes an outer housing having an outer wall and an inner wall enclosing a plurality of bearings. An inner rim having an outer wall and an inner wall is secured to the outer housing. The outer wall of the inner rim being secured on one side to the inner wall of the outer housing and is in moveable contact with the plurality of bearings. The inner rim having a plurality of gear teeth operably positioned therein. A central hub having propeller means operably secured thereto for engagement with the inner wall of the inner rim is positioned within the inner rim. The inner rim is rotatable within the outer housing. Drive shaft means for engagement with the inner rim are provided with the drive shaft means being operably linked to a generator operably coupled with the wind wheel. Support means, preferably comprising a brace, are provided for supporting the wind wheel on the platform.

In FIG. 1, the wind wheel 10, for the generation of electric energy is shown with support Lower 12 and platform 14.

Support tower 12 may be provided as a single pole or alternatively as a pair of poles or angled supports. Preferably support tower 12 is composed of a durable resilient material such as steel, composite, metal alloy or the like. Platform 14 is preferably rectangularly configured, however other shapes may be used if desired, such as round square, or oval. Platform 14 is preferably made of wood, metal, composite, thermoplastic or other durable material.

Wind wheel 16 is mounted on platform 14 by bolts, screws, welds, or other mechanical fastening means well known in the art, and is preferably mounted in an off set position 17 in relation to central axis 19 of support tower 12 and downwind from central axis 19 allowing wind wheel 16 to automatically face into the wind. Wind wheel 16 preferably includes an outer housing 18, preferably composed of steel or other durable resilient material, and has outer wall 20 and inner wall 22 housing a plurality of bearings 26 in inner cavity 24. Wind wheel 16 rotates about outer housing 18 on bearings 26, with outer housing 18 preferably secured at a lower portion to platform 14.

In FIG. 2, a geared flange 28 with gear teeth 29 is enclosed within outer rim 30 and inner rim 32 and is secured within outer housing 18 so that geared flange 28 may rotate freely within outer housing 18. This may be accomplished by securing outer rim 30 of geared flange 28 to inner wall 22 of outer housing 18 by matching groves or runners, tracks, or retaining flanges in outer housing 18 and outer rim 30.

As seen in FIGS., 1 and 2, a central hub 33 secures propeller means, preferably comprising propeller 35 with blades 36. Blades 36 of propeller 35 are secured to inner rim 32 of geared flange 28 by welds 37, bolts, retaining rings or other mechanical fastening means, and when blades 36 are rotated by the wind they move geared flange 28 within outer housing 18 on bearings 26. Blades 36 are preferably configured in an airfoil configuration, however, other blade configurations may be used such as planar, paddle shape, wing shaped, or the like. A support brace 44 may be used to support wind wheel 16, and a perch 46, preferably mounted on an upper portion of outer housing 18 at a 90 degree angle from wind wheel 16, may be provided as a safe landing site for birds.

Figure 4:
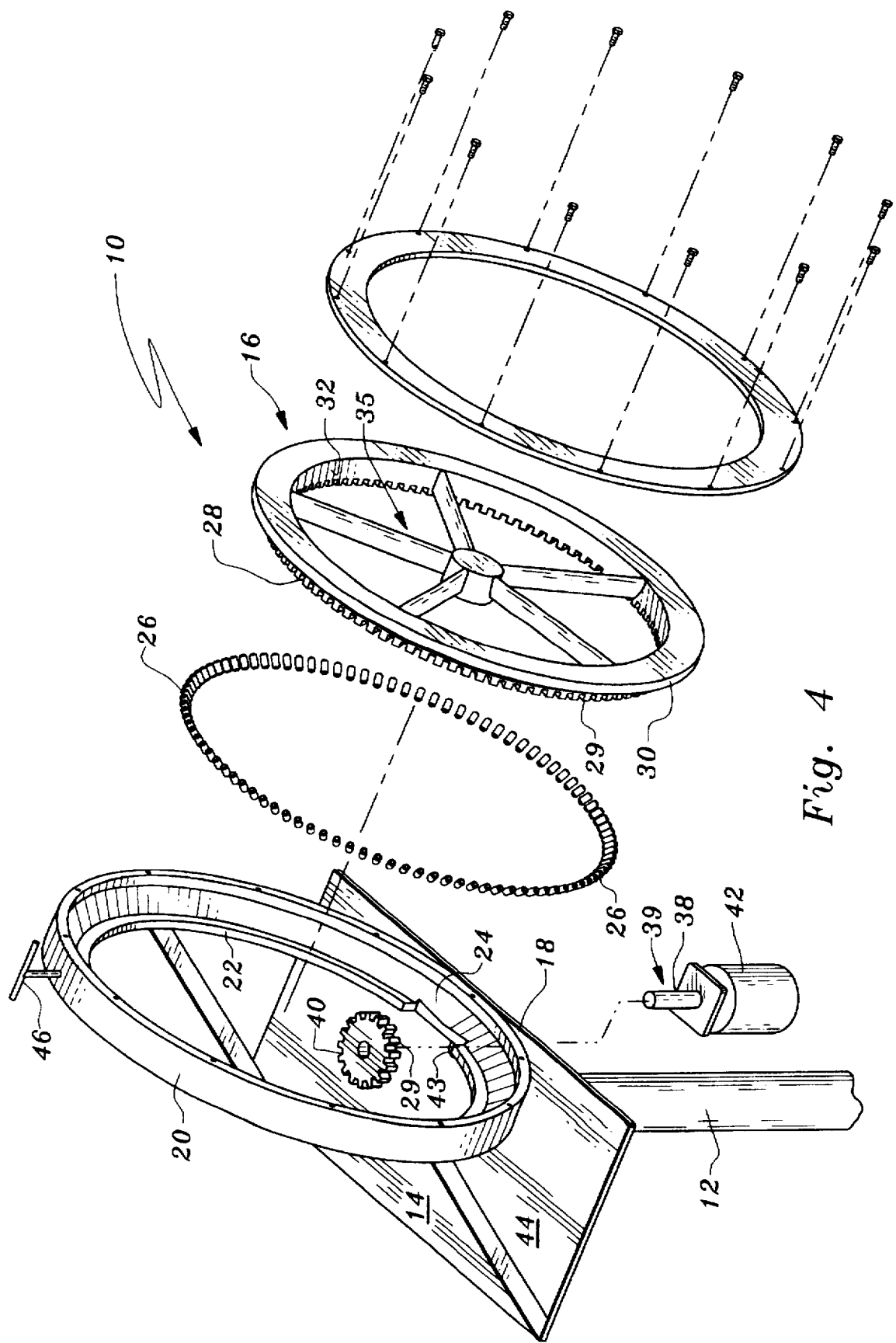
FIG. 4 is an exploded view of the propellers and inner rim of such wind wheel, according to the invention.

With reference to FIG. 3, wind wheel 16 is seen in a sectional view with outer housing 18 and geared flange 28 with gear teeth 29. Outer housing 18 is preferably of a circular configuration but may be otherwise. Geared flange or rim 28 runs on bearings 26 in outer housing 18 and is propelled by propeller 35 with blades 36. In FIG. 4, an exploded view of the inner rim 32 with propellers 35 secured thereto is seen.

Figure 5:
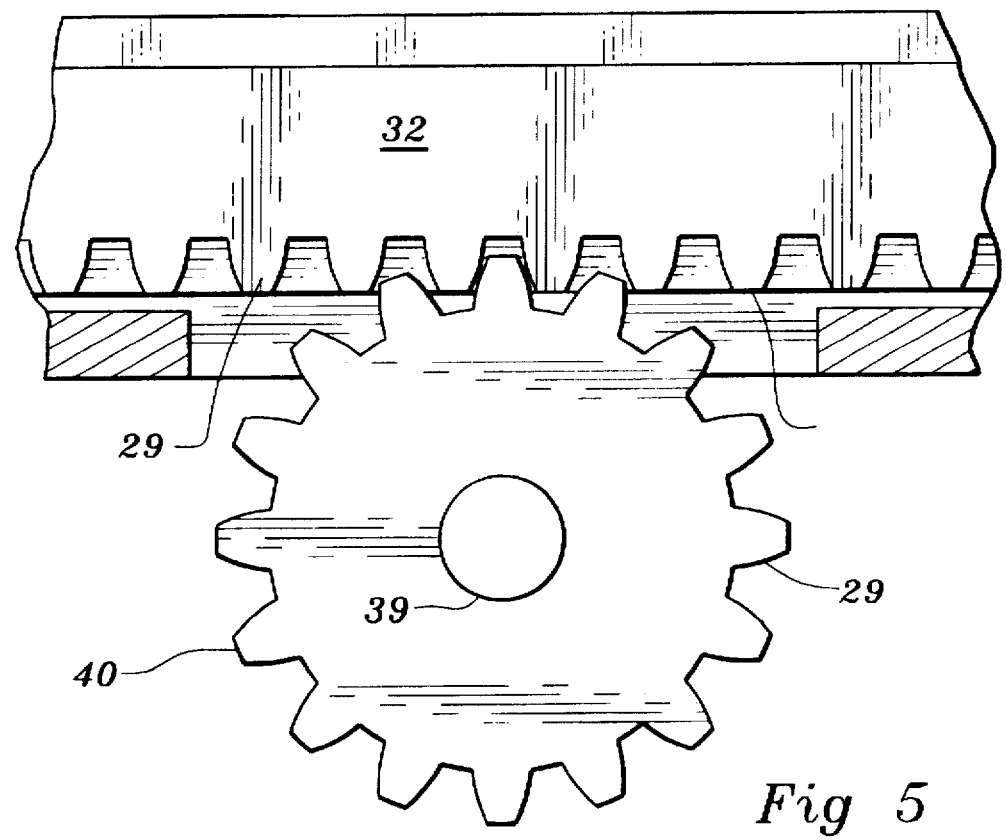
FIG. 5 is a sectional view showing the coupling of the drive shaft to the geared flange, according to the invention.

With reference now to FIG. 5, drive shaft means 38 are operably coupled to generator 42 and preferably includes shaft 39 and engagement gear 40 secured to shaft 39 which passes through access aperture 43 in outer housing 18. Engagement gear 40 is operably coupled to geared flange 28 and is rotated when geared flange 28 is rotated by the movement of propeller blades 36. In this manner drive shaft 36 transfers mechanical movement from geared flange 28, powered by wind-driven propeller blades 36, to generator 42 for the production of electrical power.

In operation and use wind wheel 10 is extremely versatile, reliable, and may be used in a wide variety of geographical areas and under all wind conditions. Support tower 12 may be built at a minimum height to reach less turbulent wind above the ground. With the present invention, propeller blades 36 may be made out of very light material because geared flange 28 both controls and contains centrifugal forces. Such blades are far cheaper to construct, install and maintain as compared to conventional windmill or wind wheel blades. As power output is at the rim of the wind wheel 16, instead of at the central shaft of a conventional windmill or wind wheel, the longer lever principal dictates that the torque conditions are much lower on wind wheel 16. The configuration of wind wheel 16 also provides a great difference in the circumference of the wind wheel 16 and the circumference of generator shaft 39, so that high rpm input to generator 42 is permitted.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A wind wheel apparatus for the generation of electrical energy, comprising:

a support tower;

a platform mounted on said support tower;

a wind wheel positioned on said platform substantially offset from a central axis of said support tower so that said wind wheel is automatically positioned to face into a wind stream; said wind wheel having an outer housing having an outer wall and an inner wall enclosing a plurality of bearings; a geared flange having an outer rim and an inner rim is secured to said outer housing, said outer rim of said geared flange being secured on one side to said inner wall of said outer housing and is in moveable contact with said plurality of bearings, said geared flange having a plurality of gear teeth operably positioned therein;

a central hub having propeller means operably secured thereto for engagement with said inner rim of said geared flange; said geared flange being rotatable within said outer housing;

drive shaft means for engagement with said geared flange; said drive shaft means being operably linked to a generator mounted on said platform; and support means for supporting said wind wheel on said platform.

2. The wind wheel apparatus of claim 1, wherein said platform is rectangularly configured.

3. The wind wheel apparatus of claim 1, wherein said geared flange is composed of steel.

4. The wind wheel apparatus of claim 1, wherein said inner wall of said geared flange is secured to one or more blades of said propeller means.

5. The wind wheel apparatus of claim 1, wherein said propeller means includes a plurality of blades configured in an airfoil shape.

6. The wind wheel apparatus of claim 5, wherein said plurality of propeller blades are composed of a durable, light weight material.

7. The wind wheel apparatus of claim 1, wherein said outer housing of said wind wheel is mechanically fastened at a bottom surface to said platform.

8. The wind wheel apparatus of claim 1, wherein said outer housing includes an aperture therein for access of said drive shaft means for operable coupling with said geared flange.

9. The wind wheel apparatus of claim 1, further including a perch mounted on an upper portion of said outer housing.

10. A power generating wind-driven wind wheel apparatus, comprising:

a support tower;

a platform mounted on said support tower;

a wind wheel mounted on said platform positioned substantially off-set from a central axis of said support tower on so that said wind wheel is automatically positioned to face into a wind stream; said wind wheel having an outer housing having an outer wall and an inner wall housing a plurality of bearings; an inner rim having an outer wall and an inner wall is secured to said outer housing, said outer wall of said inner rim being secured on one side to said inner wall of said outer housing and is in moveable contact with said plurality of bearings; said inner rim having a plurality of gear teeth operably positioned therein;

a central hub having propeller means operably secured thereto for engagement with said inner wall of said inner rim and being positioned within said inner rim; said inner rim being rotatable within said outer housing;

drive shaft means for engagement with said inner rim; said drive shaft means being operably linked to a generator operably coupled with said wind wheel; and support means for supporting said wind wheel on said platform.

11. The wind wheel apparatus of claim 10, wherein said platform is rectangularly configured.

12. The wind wheel apparatus of claim 10, wherein said inner rim is composed of steel.

13. The wind wheel apparatus of claim 10, wherein said inner wall of said geared flange is secured to one or more blades of said propeller means.

14. The wind wheel apparatus of claim 10, wherein said propeller means includes a plurality of blades configured in an airfoil shape.

15. The wind wheel apparatus of claim 14, wherein said plurality of propeller blades are composed of a durable, light weight material.

16. The wind wheel apparatus of claim 10, wherein said outer housing of said wind wheel is mechanically fastened at a bottom surface to said platform.

17. The wind wheel apparatus of claim 10, wherein said outer housing includes an aperture therein for access of said drive shaft means for operable coupling with said gear teeth of said inner rim.

18. The wind wheel apparatus of claim 10, further including a perch mounted on an upper portion of said outer housing.

* * * * *